Patented Dec. 23, 1952

2,623,034

UNITED STATES PATENT OFFICE 2,623,034

CRYSTALLINE TETRAMETHYLENE ISOPHTHALATE POLYMER

Paul J. Flory, Kent, and Frederick S. Leutner, Cuyahoga Falls, Ohio, assignors to Wingfoot Corporation, Akron, Ohio, a corporation of Delaware No Drawing. Application July 12, 1947, Serial No. 760,690

7 Claims. (Cl. 260—75)

This invention relates to a new and valuable polyester which can be fabricated readily into filaments capable of being cold drawn to form strong elastic fibers. More specifically the invention relates to linear polymers made by the condensation of tetramethylene glycol and isophthaloyl chloride and to a method for their preparation.

In application Serial No. 683,990, filed July 16, 1946, there is described and claimed a new class of linear polyesters and methods of preparing them by the inter-reaction of glycols and diacid chlorides of aromatic dibasic acids. When this method of synthesis is employed, the rate of polymerization resulting from the use of the acid chlorides is much greater than when the corresponding acids or esters are used, with the result that polyesters of exceptionally high molecular weights are obtained without requiring extended reaction periods. In further contrast to the previous methods of synthesis involving the reaction between dibasic acids, or their monohydric alcohol esters, and glycols, this reaction is non-reversible and the by-product, hydrogen chloride, is readily volatile; hence it is readily removed from the reaction vessel without resorting to prolonged evacuation or other special procedures, as have been necessary in the prior art practice. Furthermore, owing to the high melting points and insolubilities of certain dibasic acids, preparation of polyesters by co-reacting them with glycols according to prior art methods is frequently difficult, whereas the acid chloride method is generally satisfactory in such cases.

One purpose of this invention is to provide a new isophthalate polyester which has an unusually high melting point. A further purpose of the invention is to provide a new polymeric composition capable of being used in the fabrication of high tensile strength fibers and yarns. A further purpose is to provide highly crystalline oriented polyester fibers containing the isophthalate radical, said fibers being characterized by a desirably high melting point and by a remarkably low residual elongation.

In accordance with this invention superpolyesters are prepared by the condensation of tetramethylene glycol and isophthaloyl chloride. This condensation product, otherwise known as tetramethylene isophthalate, has the general formula

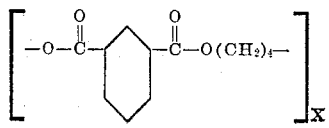

Whereas this polyester normally occurs in the non-crystalline, or amorphous form in which condition it has little practical value, we have found that crystallization may be induced through proper application of physical conditioning procedures. In particular, a high degree of oriented crystallization may be induced in fibers from this polyester, whereupon they exhibit high strength and other desirable properties including a melting temperature above 140° C.

Linear polyesters usually melt at temperatures below 100° C. and such low melting temperatures are inherent limitations on the use of the polyesters generally for the production of synthetic fibers. This is particularly true of polyesters formed from polymethylene glycols and aliphatic dibasic acids or their derivatives. In application Serial 695,056, filed September 5, 1946, and in Serial No. 683,990, filed August 16, 1946, comparatively high melting polyesters prepared from polymethylene glycols, $HO(CH_2)_nOH$ where $n=4$ to 10 and terephthaloyl chloride are described and claimed. These polyesters melt above 100° C. In general, they crystallize readily on cooling and normally they are highly crystalline at temperatures below their melting points. It has been observed that the corresponding isophthalates, on the other hand, generally are obtained in the transparent and non-crystalline form. On cooling the reaction mixture after polymerization the polymers remain transparent and are somewhat rubbery. X-ray diffraction photographs show amorphous halos with no evidence of crystallinity.

The above observations might well lead to the conclusion that polymethylene isophthalate polyesters are characteristically non-crystalline. Some investigators of the prior art have reported that these polymers are not crystallizable and this appears to be true with respect to ethylene isophthalate and pentamethylene isophthalate.

Further investigation has revealed, however, that certain of the polyesters of this series can be induced to crystallize when subjected to proper conditions which may be listed as follows:

(a) Annealing, i. e., by heating the amorphous polymer for a sufficient period of time, e. g., several hours, at a temperature some 20 to 80° C. or so below its melting temperature.

(b) By casting from solution in a volatile solvent, e. g., ethylene dichloride or chloroform.

(c) By stretching at room temperature, or at a temperature well below the melting point.

However, all of the above methods are not effective generally in transforming a given polymethylene isophthalate polymer.

For example, methods *a* and *b* appear to be ineffective in inducting crystallization in decamethylene isophthalate polymers of high molecular weight. However, they can be converted to crystalline form by racking, that is, by stretching several hundred percent, at room temperature. Fibers racked in this manner recover relatively little when the tension is released. They show a characteristic X-ray fiber diagram indicative of oriented crystallization. On warming above 40° C., however, they retract approximately to their original dimensions and all signs of crystallinity disappear above about 50° C.

When hexamethylene isophthalate is heated at 60° C. for several hours, it gradually becomes opaque and sharp rings develop in the X-ray diffraction pattern. Oriented crystallinity can be induced by stretching fibers or films to high elongations. However, crystallinity induced by annealing seems to disappear around 80° C., and that induced by stretching at about 106° C., although the oriented fibers or films retract at about 85 to 95° C. The hexamethylene isophthalate does not become highly crystalline by casting from solutions.

It has now been found that tetramethylene isophthalate has quite unusual properties. Crystallization can be induced by any of the three methods listed above. Annealing at 100 to 110° C. is effective, for example, and films cast from ethylene dichloride or chloroform solutions are highly crystalline; so much so in fact that they are brittle and opaque. Tetramethylene isophthalate induced to crystallize by either of these methods melts at about 142° C. Fibers of this polymer crystallize readily on drafting and a high degree of crystallinity develops. When properly drafted the fibers do not shrink appreciably below about 135° C., and the crystallinity does not vanish below about 150° C. Thus, tetramethylene isophthalate is unique among the polymethylene isophthalates in that it readily acquires a high degree of crystallinity under any of the conditions noted above, and particularly in that its melting temperature lies well above 100° C. It should be noted, however, that highly crystalline character is imparted only through proper physical treatment. Particularly good results are obtained when the polymers have a molecular weight in excess of 15,000.

The new linear polyester may be prepared in an autoclave of any corrosion resistant material, preferably of glass, or lined with glass, equipped with a mechanical stirring device and an adjustable gas entry tube which can be immersed in the molten reaction mass when required. The apparatus is also provided with a means for applying a vacuum to the reaction mass for the purpose of removing gaseous reaction products from the reactor and gas bubbles from the viscous polymer. The gas inlet tube provides a continuous supply of an inert gas for the purpose of sweeping out the volatile reaction products and maintaining an oxygen-free atmosphere, thereby preventing the decomposition of the polymer. The gas inlet tube is also used to measure the melt viscosity during the reaction, by the method described in the Journal of the American Chemical Society, volume 62, page 1057.

The new polyester may be prepared by mixing substantially equimolecular proportions of tetramethylene glycol and isophthaloyl chloride at or near room temperature. Preferably, the liquid glycol and the solid acid chloride should be intimately mixed, for example, by mechanical agitation within the reaction vessel. The reaction proceeds gradually at first and then more rapidly, and in the course of a few minutes is accompanied by a moderate increase in temperature and a copious evolution of hydrogen chloride. The initial reaction quickly subsides and the reaction mass must be heated at an elevated temperature, preferably above 100° C., but not above 250° C., until no further evolution of hydrogen chloride is observed, at which time the reaction is complete and the product will have a melt viscosity of at least 500 poises at 218° C.

An alternative method is useful in preparing the new polymers, whereby the isophthaloyl chloride is charged to the reactor and melted by heating at about 100° C. With the reaction maintained at this temperature, tetramethylene glycol is added gradually and at such a rate that the reaction with acid chloride groups of the polymer keeps the glycol concentration at a low level. After about 95 percent of the required amount of glycol has been added, the polymer becomes too viscous for effective stirring. The reaction temperature is then increased to about 200° C. and glycol addition is continued until the melt viscosity reaches approximately 100 poises. After evacuation to remove bubbles and dissolved hydrogen chloride, the melt viscosity is accurately determined. Further increases in melt viscosity and molecular weight may be effected by the addition of small increments of tetramethylene glycol, the reaction being followed by a series of melt viscosity determinations. It is desirable to reach an ultimate melt viscosity of 500 to 4000 poises, at 218° C.

When the reaction approaches completion and the first accurate melt viscosity measurement has been made subsequent to an evacuation of the reaction vessel, the quantity of glycol required to reach the optimum viscosity can be estimated from the measured melt viscosity. This is done by determining the empirical relationship between melt viscosity and deficiency of glycol under standard operating conditions. It is thereby possible to increase the melt viscosity to the optimum value with a single addition of tetramethylene glycol.

It is important to employ pure reactants in both the above methods of preparation. Tetramethylene glycol of adequate purity, as indicated by a freezing point above 19.6° and preferably from 19.8 to 20.1° C., can be obtained in good yield by low-temperature crystallization from an anhydrous acetone-ether mixture, starting with distilled glycol of about 95% purity or better. The isophthaloyl chloride can be purified by successive crystallizations of the distilled acid chloride from dry hexane or petroleum ether, protecting the solutions and product from moisture of the air to prevent hydrolysis. The melting point of the purified acid chloride should be at least 45–46° C.

The tetramethylene isophthalate condensation polymer is a valuable source of synthetic textile fibers which may be melt-spun or extruded through suitable dies or orifices. The extruded filaments may be cooled by air or by a non-solvent cooling medium after which they may be wound on a reel. Special handlings to assure rapid cooling in order to avoid crystallization at this stage are unnecessary since the polymer is reluctant to crystallize on cooling as already noted. On the other hand, the fibers tend to be sticky in the non-crystalline condition and hence difficult to unwind from the reel. The fibers show less tendency to adhere to one another if well cooled and dusted with an inert finely powdered material such as talc before reaching the reel.

Fibers spun from tetramethylene isophthalate polymers of suitable high molecular weight can be drafted between rolls operated at differential speeds, for example, at peripheral speed ratios in the ranges from 4 to 1 and 6 to 1. Better results are usually obtained by allowing the drafting to occur at elevated temperatures, which may be conveniently effected by interposing a bath of a heated non-solvent liquid between the differential rolls. Such a non-solvent liquid may be glycerol, water or a molten metal, such as mercury or Wood's metal. If desired, the drafting may be conducted in two stages, the first at room temperature and the second at an elevated temperature.

The fibers crystallize during the drafting operation, thereafter they are neither sticky nor rubbery. X-ray photographs indicate a high degree of crystallinity, crystallites being well oriented with respect to the fiber axis. Fibers thus obtained are strong, pliable and characterized by unusually low elongation.

In order to avoid the difficulties encountered in handling the inherently tacky, non-crystalline undrawn fibers, it is preferred to carry out the drafting operation simultaneously with spinning. The spun fibers are wound a number of times around a drum operating at constant speed from which they pass to a second drum operating at a faster peripheral speed, the speed being in fixed ratio to the speed of the first drum. From this drum, the fibers pass to a windup reel. Drafting between the two drums induces crystallization, thus eliminating all stickiness. Usually it is preferred to secure only a partial draft in this step. Further drafting to approach the maximum possible draw ratio can be carried out in a subsequent operation in which drafting at a higher temperature may be employed as pointed out above.

The melting points of the tetramethylene isophthalate polymers can best be observed by viewing the specimen when on a microscope stage between crossed polaroids. A specimen of crystalline polymer transmits partially depolarized light, causing the specimen to appear bright in a dark field. At the melting point, the sample becomes dark in appearance. Very accurate determinations of the melting point may be obtained by measuring the temperature at which this physical change takes place. Samples of undrafted tetramethylene isophthalate fibers melt at 140 to 146° C. while the melting point of drafted fibers is usually between 145 to 155° C., depending on the amount of drafting. The drafted fibers, upon being heated, begin to shrink without complete melting at about 135° C.

Although the principal uses contemplated for the new polyester lie in the fabrication of textile fibers and yarns and of large monofilaments, the polymers may also be used in the manufacture of molded articles, electric insulations, and films.

Other desirable polymers may be obtained in accordance with the invention herein described by using a plurality of glycols, one of which is tetramethylene glycol. Thus, by replacing up to 10% of the tetramethylene glycol with another glycol having in excess of three carbon atoms, for example, decamethylene glycol and hexamethylene glycols, interpolymers, or mixed polymers, having somewhat lower melting points and less pronounced crystallinity may be prepared. Similar modified polymers may be prepared by replacing up to 10% of the isophthaloyl chloride with another suitable acid chloride, for example, terephthaloyl chloride. By means of these interpolymers, films and fibers having slightly modified physical properties are readily fabricated.

The following specific examples describe in more detail the method of practicing this invention.

*Example 1*

A glass reaction vessel provided with an adjustable inlet tube capable of being immersed in the polymer when desired was charged with 6.258 parts by weight of isophthaloyl chloride and 2.806 parts of tetramethylene glycol. This represented a 1 percent molar excess of the tetramethylene glycol. The reactants were mixed in a nitrogen atmosphere maintained by passing a continuous stream of nitrogen through the reaction vessel by means of the gas inlet tube. The reaction temperature increased to 40° C. shortly after the reactants were mixed. Ten minutes after the mixture was effected heat was applied until a temperature of 218° C. was reached, which temperature was maintained for 35 minutes. A clear viscous polymer having a melt viscosity of 2500 poises was thereby obtained. A film drawn from the non-crystalline amorphous material crystallized upon standing to form a white opaque sheet. The new polymer melted sharply at a temperature of 140–142° C.

Filaments were obtained by spinning the hot melt. These filaments were drawn at 25° C. around a steel pin ⅜" in diameter between differential rollers operating at a speed ratio of 5.4 to 1. The fibers so produced had a tenacity of 3.55 grams per denier and a residual elongation of 15.8 percent. A second draft through a bath of Wood's metal at 100° C. increased the tenacity to 3.88 grams per denier and reduced the residual elongation to 5.2 percent.

*Example 2*

A reaction vessel equipped with a mechanical stirrer, an outlet tube for liberated hydrogen chloride and a nitrogen inlet tube extending below the surface of the reactants was charged with 30.00 parts by weight of pure isophthaloyl chloride. A dropping funnel inserted in the nitrogen inlet tube was charged with 13.32 parts of pure tetramethylene glycol. While maintaining the reaction tube at a temperature of 110° C., the glycol was added at a rate of about 0.2 part per minute to the molten acid chloride, with vigorous stirring of the reaction mixture, over a period of one hour. The remaining small amount of glycol was added slowly over a period of one and one half hours while the temperature was increased from 110° C. to 218° C. After all of the glycol had been added the temperature was maintained at 218° C. for three hours, to give a clear viscous polymer having a melt viscosity of 3400 poises at 218° C.

*Example 3*

Using the apparatus of Example 1, 6.232 parts by weight of pure isophthaloyl chloride (90 percent of the total molar amount of acid chlorides) and 0.6924 part by weight of pure terephthaloyl chloride (10 percent of the total molar amount of acid chlorides) were added to 3.104 parts by weight of pure tetramethylene glycol which was frozen by immersion of the apparatus in ice. The amount of glycol used was one percent over the equivalent amount of glycol required for complete reaction with the combined acid chlorides. The reactants were mixed by thorough stirring while heating for two minutes at 110° C. Further heating at 218° C. for 2¼ hours produced a clear viscous polymer having a melt viscosity of 1800 poises.

Filaments drawn from the molten polymer could be cold drawn to give fibers which were highly crystalline when held under tension for a few minutes. The drafted fibers so produced melted at 140–141° C., while the crystallized polymer obtained by casting from solution in ethylene dichloride melted at 124.5–126° C.

Although the invention has been described with respect to specific examples it is not intended that the details thereof shall be construed as limitations upon the scope of the invention except to the extent incorporated in the following claims.

We claim:

1. A crystalline superpolymer of tetramethylene isophthalate.
2. Crystalline polymeric tetramethylene isophthalate having a molecular weight in excess of 15,000.
3. A filament of superpolymeric tetramethylene isophthalate having an oriented crystalline structure.
4. A method of preparing crystalline tetramethylene isophthalate which comprises preparing a non-crystalline superpolyester by condensing equimolecular proportions of tetramethylene glycol and isophthaloyl chloride and causing said non-crystalline superpolyester to crystallize.
5. A method of preparing crystalline tetramethylene isophthalate which comprises preparing a non-crystalline superpolyester by condensing equimolecular proportions of tetramethylene glycol and isophthaloyl chloride and causing said non-crystalline superpolyester to crystallize by annealing it.
6. A method of preparing crystalline tetramethylene isophthalate which comprises preparing a non-crystalline superpolyester by condensing equimolecular proportions of tetramethylene glycol and isophthaloyl chloride and causing said non-crystalline superpolyester to crystallize by casting it from solution in a volatile solvent.
7. A method of preparing crystalline tetramethylene isophthalate which comprises preparing a non-crystalline superpolyester by condensing equimolecular proportions of tetramethylene glycol and isophthaloyl chloride and causing said non-crystalline superpolyester to crystallize by cold drawing it.

PAUL J. FLORY.
FREDERICK S. LEUTNER.

REFERENCES CITED

The following references are of record in the file of this patent:

UNITED STATES PATENTS

| Number | Name | Date |
|---|---|---|
| 2,012,267 | Carothers | Aug. 27, 1935 |
| 2,224,037 | Brubaker et al. | Dec. 3, 1940 |
| 2,333,639 | Christ et al. | Nov. 9, 1943 |
| 2,424,884 | Cook et al. | July 29, 1947 |
| 2,437,232 | Rothrock et al. | Mar. 2, 1948 |
| 2,465,319 | Whinfield et al. | Mar. 22, 1949 |

FOREIGN PATENTS

| Number | Country | Date |
|---|---|---|
| 849,985 | France | Aug. 28, 1939 |